Patented Mar. 7, 1950

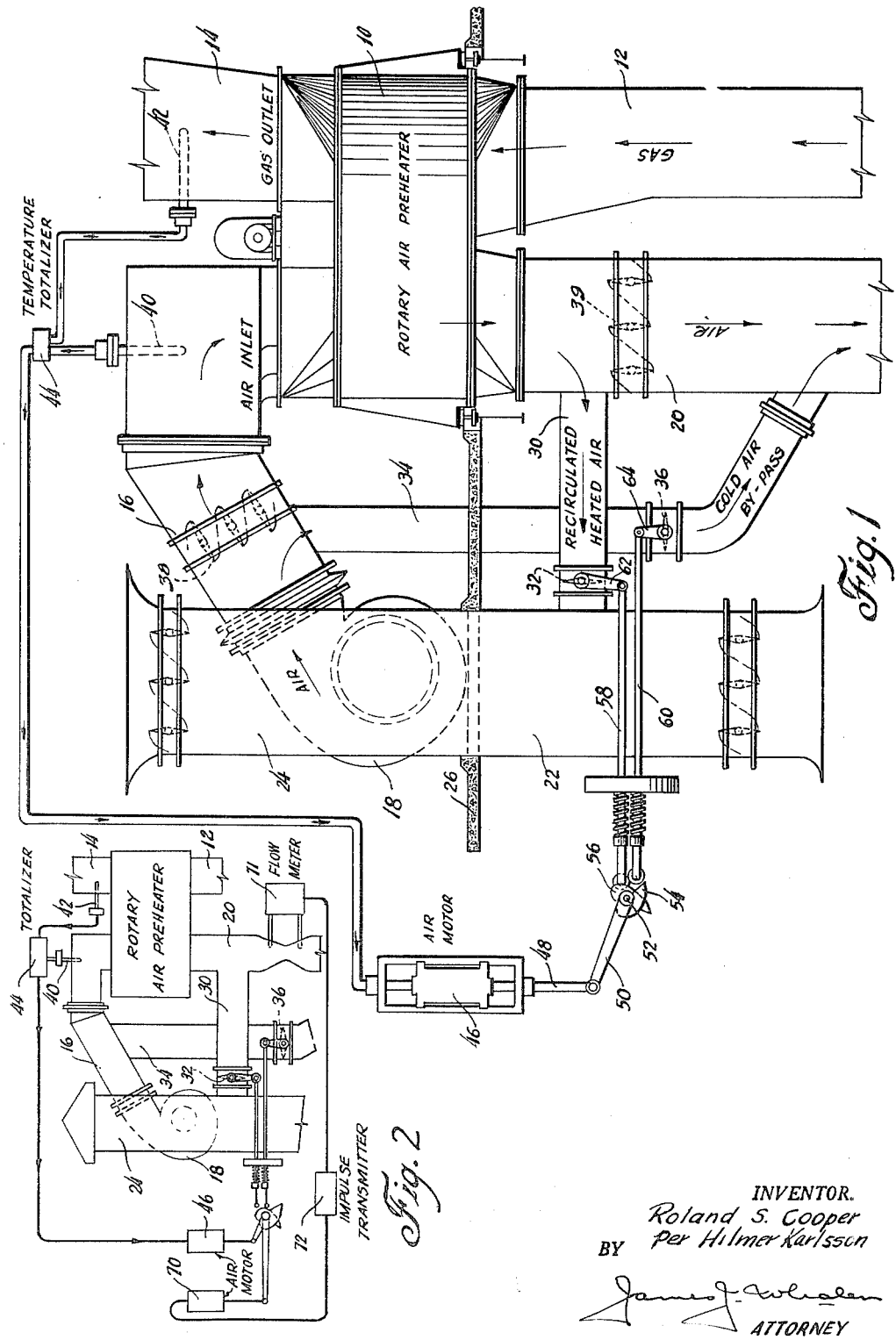

2,499,358

UNITED STATES PATENT OFFICE 2,499,358

CORROSION CONTROL IN AIR HEATERS BY RECIRCULATION AND BY-PASSING

Roland S. Cooper, Oak Park, Ill., and Per Hilmer Karlsson, Wellsville, N. Y., assignors to The Air Preheater Corporation, New York, N. Y.

Application January 22, 1948, Serial No. 3,797

3 Claims. (Cl. 257—2)

The present invention relates to heat exchange apparatus and particularly to means for reducing corrosion in regenerative air preheaters.

The trend in steam power plant practice today is toward large units and higher boiler efficiency. The latter requires gas temperatures leaving the preheater of 300° F. and lower. The high cost of buildings has in turn made it desirable to have them as small as possible which results in outdoor installations of some of the equipment on occasions. Likewise with inside installations, the large volume of combustion air required for the large units usually causes drafts in winter and operation of the boiler room under negative pressure with the result that there is a trend toward the use of outside air for combustion. These considerations have made it necessary to have good control of the metal temperature of the preheaters at the cold end to avoid corrosion and deposit as well as shutdowns except at annual outage periods.

The invention contemplates the reduction or elimination of corrosion of the metallic plates in an air preheater by maintaining the temperature of the plates above the dew point of the gases through recirculation of some of the intensely heated air at loads between low and near maximum boiler load while by-passing a portion of the cool entering air around the preheater at maximum boiler loads.

The invention will be best understood upon consideration of the following detailed description thereof when read in conjunction with the accompanying drawing in which Figure 1 is a diagrammatic view of an air preheater installation embodying the invention; and Figure 2 is a similar view of a modified arrangement.

In the drawing the numeral 10 designates a rotary regenerative air preheater of the Ljungstrom type which comprises a casing containing a rotor carrying heat transfer material in the form of spaced metal plates that absorb heat from gases of combustion and which when turned into the air passage impart the heat to the air for supporting combustion in the furnace. The hot gaseous products of combustion from a steam generating boiler are conveyed to the preheater through a duct 12 and after imparting a substantial portion of their heat to the metallic plates carried by the preheater rotor the cooled gases are discharged through an outlet duct 14 to the stack. Air to be preheated is supplied to the preheater 10 through a duct 16 by forced draft fan 18 and picking up the heat from the plates on the air side of the preheater 10 the heated air is conveyed through a duct 20 to the boiler furnace. The air supplied by the fan 18 may be taken from the boiler room through the duct 22 or drawn from outside the plant through the duct 24 which projects above the roof 26 of the plant.

To provide for the recirculation of part of the preheated air for raising the air entering the preheater to a safe temperature above the dew point of the gases a duct 30 provided with a damper 32 is connected between the air outlet duct 20 and the inlet piping 22 for the forced draft fan 18. In order to regulate the amount of cool air passed through the preheater so that the temperature of the heat transfer elements may be controlled for the purpose mentioned above a by-pass duct 34 extends from the air inlet duct 16 to the air outlet duct 20 and has therein a damper 36. Dampers 38 and 39 are provided in the air inlet duct 16 and in the air outlet duct 20 ahead of the by-pass 34 so as to restrict flow through the air preheater and thus divert a greater quantity through the recirculation conduit 30 or by-pass duct 34 as the case may be.

The mean temperature of the heat transfer plates in a rotary regenerative preheater is considered to be more or less accurately represented by one-half the total of the temperatures of air entering the preheater and the gas discharged from the latter.

The temperatures of air entering the preheater and cooled gas discharged therefrom are measured by the thermostats 40 and 42 extending into the ducts 16 and 14 respectively. These temperatures are averaged in a "totalizer" designated as a whole by the numeral 44 which may be a pneumatic control apparatus such as described in Cooper Patent 2,320,911 issued June 1, 1943. As more fully described in said patent, variations in the total of the air inlet and gas outlet temperatures from a predetermined standard value are reflected in the operation of an air motor 46. Motor 46 has a piston rod 48 connected through a link or crank-arm 50 to turn a shaft 52 in one direction or other in proportion to variations in the temperature conditions existing in the air inlet 16 and gas outlet 14 of the preheater. Various types of mechanical or electrical mechanisms may be employed to operate the dampers 32 and 36 in the recirculation and by-pass ducts 30, 34 to carry out the invention. For the purpose of illustration a suitable form may consist of cams 54 and 56 mounted on shaft 52 and acting against the thrust rods 58 and 60 which are connected at their opposite ends to the arms 62 and 64 attached to the shafts for the dampers 32 and 36 respectively.

In operation, as the load on the steam generating boiler decreases from high load towards minimum, the average temperature at the cold end of the preheater or in the air inlet and gas outlet ducts 16, 14 tends to fall. These departures from the predetermined temperature value which may represent the dew point of the fuel being burned are picked up by the thermostats 40 and 42 and eventually cause operation of motor 46 to turn shaft 52 step by step in a counter-clockwise direction as the average temperature periodically drops below the predetermined value with each increase in load. The smaller the load on the boiler becomes the lower the metal temperature would be unless corrective steps were taken and accordingly the contour of the cam 54 is such as to continuously increase the opening of the damper 32 in the recirculation conduit 30 to return greater and greater quantities of heated air to the air inlet so as to maintain the temperature of the plates at a value above the dew point of the gases at which moisture would be condensed on the plate surfaces and result in their corrosion and eventual clogging of the preheater passages. The provision of a fan of sufficient capacity to recirculate the large amounts of preheated air that might be required at very high boiler loads would result in an uneconomic installation because of the extra capital expenditure that would initially have to be made to provide a fan of sufficient size to handle the large volume of air required. In addition to the large initial capital expenditure required, the control of an oversize fan to handle the large quantity of air would introduce a difficult operating problem. Therefore, in accordance with the present invention the fan 18 which is provided is not of excessive capacity but is designed to handle the load of fresh and recirculated air required for low and near peak loads. At peak loads when the damper 32 has already reached its full open position, the cam 56 associated with the by-pass damper 36 then becomes effective to initiate opening of the by-pass damper 36 so that part of the relatively cool air which would otherwise pass through the preheater is conveyed through conduit 34 directly to the hot air outlet duct 20.

As the by-pass damper 36 moves from closed towards its open position under the action of its cam 56, the recirculation damper 32 tends to close under the influence of cam 54 thereby diminishing the amount of recirculated air and reducing the total load placed upon the forced draft fan 18 as the boiler approaches maximum load.

Assuming an average yearly temperature of 50° for the plant location and the desire to have the most efficient economical boiler unit using outside air for combustion the following would represent the performance without control:

| | | | | |
|---|---|---|---|---|
| Evaporation, lbs./hr | 300,000 | 450,000 | 600,000 | 660,000 |
| Gas entr. htr., lbs./hr | 375,000 | 562,000 | 750,000 | 825,000 |
| Comb. air thru htr., lbs./hr | 306,000 | 459,000 | 611,000 | 672,000 |
| Gas temp. entr. htr., °F | 560 | 630 | 690 | 705 |
| Gas temp. lv. htr., °F | 218 | 253 | 285 | 294 |
| Air temp. entr. htr., °F | 50 | 50 | 50 | 50 |
| Air temp. lv. htr., °F | 492 | 537 | 573 | 580 |
| APL, "WG | 1.20 | 2.40 | 4.05 | 4.80 |
| DL, "WG | .80 | 1.65 | 2.75 | 3.20 |
| Metal temp. of cold end, °F | 145 | 165 | 183 | 188 |

If the coal had a dew point of 175° corresponding to 2.75% sulphur content (higher with 4–5% sulphur coals) it is obvious that the efficiencies shown would result in inoperable conditions of corrosion and deposit in the preheater with the low outlet gas temperature and metal temperature at the cold end of the preheater.

If air bypassing alone were used to raise the metal temperature above the dew point the high efficiencies would not be obtainable. This is shown in the following tabulation.

| | | | | |
|---|---|---|---|---|
| Evaporation, lbs./hr | 300,000 | 450,000 | 600,000 | 660,000 |
| Gas entr. htr., lbs./hr | 375,000 | 562,000 | 750,000 | 825,000 |
| Comb. air thru htr., lbs./hr | 209,000 | 373,000 | 576,000 | 652,000 |
| Air bypassed, lbs./hr | 97,000 | 86,000 | 35,000 | 20,000 |
| Total air for comb., lbs./hr | 306,000 | 459,000 | 611,000 | 672,000 |
| Gas temp. entr. htr., °F | 560 | 630 | 690 | 705 |
| Gas temp. lv. htr., °F | 300 | 300 | 300 | 300 |
| Air temp. entr. htr., °F | 50 | 50 | 50 | 50 |
| Air temp. lv. htr., °F | 540 | 575 | 585 | 587 |
| Air temp. to burners, °F | 385 | 478 | 568 | 573 |
| APL, "WG | .60 | 1.75 | 3.60 | 4.80 |
| DL, "WG | .85 | 1.70 | 2.75 | 3.20 |
| Metal temp. cold end, °F | 213 | 203 | 195 | 192 |

From the above it appears that the amounts of bypassed air at the lower loads are excessive. This is due to the fact that the only known control for bypassing is temperature control. It is noted that the average of the entering air temp. and leaving gas temp. is 175° at the various loads which coincides with the dew point determination and that at the upper loads the metal temperature is not far removed from those under non-control conditions.

When utilizing hot air recirculation alone either the temperature of the air entering the heater is maintained constant or the average of the entering air and leaving gas temperature is used to control the recirculation. The same heater with only hot air recirculation would have the following performance based on 50° ambient air as before:

| | | | | |
|---|---|---|---|---|
| Evaporation, lbs./hr | 300,000 | 450,000 | 600,000 | 660,000 |
| Gas entr. htr., lbs./hr | 375,000 | 562,000 | 750,000 | 825,000 |
| Comb. air thru htr., lbs./hr | 306,000 | 459,000 | 611,000 | 672,000 |
| Air recirculated, lbs./hr | 72,000 | 49,000 | 24,000 | 9,000 |
| Total air thru heater, lbs./hr | 378,000 | 508,000 | 635,000 | 681,000 |
| Gas temp. entr. heater, °F | 560 | 630 | 690 | 705 |
| Gas temp. lv. heater, °F | 228 | 258 | 285 | 293 |
| Air temp. entr. heater, °F | 122 | 92 | 65 | 57 |
| Air temp. lv. heater, °F | 468 | 526 | 568 | 582 |
| APL, "WG | 1.75 | 2.85 | 4.30 | 4.90 |
| DL, "WG | .80 | 1.65 | 2.75 | 3.20 |
| Metal temp. cold end, °F | 176 | 181 | 187 | 190 |

It will be noted that the average of the entering air and leaving gas temperature is still 175° and that the metal temperatures at the cold end are above the predetermined 175° dew point. It is evident that the efficiencies shown are feasible with recirculation. However, the weight of air to be handled by the forced draft fan and the resistance thru the preheater on the air side exceed the original requirements. A forced draft fan could be redesigned to take care of the added resistance and volume but lower ambient air temperatures than 50° would require even more recirculation and higher temperatures would require less so that the oversize forced draft fan would represent a difficult operating problem for control as well as a larger investment in first cost.

When recirculating heated air up to the maximum load and then bypass cool air at the peak load in accordance with the invention the high efficiencies desired are obtainable and the forced draft fan remains a standard size. The performance with combined recirculation and bypassing would be:

| | | | | |
|---|---|---|---|---|
| Evaporation, lbs./hr | 300,000 | 450,000 | 600,000 | 660,000 |
| Gas entr. htr., lbs./hr | 375,000 | 562,000 | 750,000 | 825,000 |
| Comb. air through htr., lbs./hr | 306,000 | 459,000 | 611,000 | 652,000 |
| Air recirculated, lbs./hr | 72,000 | 49,000 | 24,000 | None |
| Air bypassed, lbs./hr | None | None | None | 20,000 |
| Air through htr., lbs./hr | 378,000 | 508,000 | 635,000 | 652,000 |
| Air handled by FD fan, lbs./hr | 378,000 | 508,000 | 635,000 | 672,000 |
| Gas temp. entr. htr., °F | 560 | 630 | 690 | 705 |
| Gas temp. lv. htr., °F | 228 | 258 | 285 | 300 |
| Air temp. entr. htr., °F | 122 | 92 | 65 | 50 |
| Air Temp. lv. htr., °F | 468 | 526 | 568 | 590 |
| Air temp. to burners, °F | 468 | 526 | 568 | 573 |
| APL, "WG | 1.75 | 2.85 | 4.30 | 4.80 |
| DL, "WG | .80 | 1.65 | 2.75 | 3.20 |
| Metal temp. cold end, °F | 176 | 181 | 187 | 193 |

As described above, the operation of by-pass damper 36 by cam 54 is in repsonse to measurements by thermostats 40, 42 that reflect the metal temperature. As an alternative a separate operating motor 70 (Fig. 2) may be provided for the by-pass damper 36 and this operated step by step in sequence to the controls for the forced draft fan as the load is increased. For example, an air flow-meter 71 associated with duct 16 would measure increased air flow as the load rises and actuate an impulse transmitter 72 to operate motor 70 step by step to open damper 36 after the forced draft fan reached its optimum capacity. Or the operation of motor 70 to open damper 36 could be manually controlled as by effecting step-by-step operation through a push button on the main control panel when the operator observed that the indicating and recording instruments showed that the load on the boiler was increasing to a point where by-passing of air would be required to maintain a desired average temperature for the incoming air and cooled gases. In either case there would be a positive cooperative relation between the operation of the by-pass damper 36 (whether by automatic air flow control or manually) and the control of recirculation damper 32 from thermostats 40, 42 because the opening of the by-pass damper 36 would cause less air to pass through the preheater with the result that the gas outlet temperature would rise and then thermostat 42 acting through totalizer 44 and motor 46 would respond by effecting step-by-step operation of the recirculation damper 32 in a direction to close it.

Furthermore, the physical relation between the cams 54 and 56 in the arrangement shown assures that so long as recirculation is effective to maintain the desired average temperature there will be no by-passing of air. This is due to the fact that although the fan 18 might supply a high volume of air that would cause motor 70 to operate shaft 52 the cam 56 would remain ineffective to cause opening of the air by-pass damper 36 until actuation of shaft 52 by the other motor 46 had turned cam 56 to effective operating position.

What is claimed is:

1. In a regenerative air preheater having inlet and outlet ducts for a heating gas, similar ducts for air, a fan in the air inlet duct, a rotor for absorbing heat from the gases and imparting it to the air, an air recirculation conduit connecting the hot air outlet duct to the inlet of said fan, and damper means operable to regulate the amount of air flowing through said conduit; a by-pass conduit connecting the outlet of said fan with the hot air outlet duct; damper means in said by-pass conduit; means for measuring temperatures in the air inlet duct and the gas outlet duct; means for obtaining the total of said temperatures; means associated with said totalizing means and operative when said temperature total drops to a predetermined value for initiating the opening of said recirculation damper; and means operative when said temperature total drops to a lower predetermined value for initiating the opening of said by-pass damper.

2. In a regenerative air preheater having inlet and outlet ducts for a heating gas, similar ducts for air, a fan in the air inlet duct, a rotor for absorbing heat from the gases and imparting it to the air, an air recirculation conduit connecting the hot air outlet duct to the inlet of said fan, and damper means operable to regulate the amount of air flowing through said conduit; a by-pass conduit connecting the outlet of said fan with the hot air outlet duct; damper means in said by-pass conduit; means for measuring temperatures in the air inlet duct and the gas outlet duct; means for obtaining the total of said temperatures; means associated with said totalizing means and operative when said temperature total drops to a predetermined value for initiating the opening of said recirculation damper; and means operative when said temperature total drops to a lower predetermined value for initiating the opening of said by-pass damper and reversely operating said recirculation damper toward closed position.

3. In a regenerative air preheater having inlet and outlet ducts for a heating gas, similar ducts for air, a fan in the air inlet duct, a rotor for absorbing heat from the gases and imparting it to the air, an air recirculation conduit connecting the hot air outlet duct to the inlet of said fan, and damper means operable to regulate the amount of air flowing through said conduit; a by-pass conduit connecting the outlet of said fan with the hot air outlet duct; damper means in said by-pass conduit; means for measuring temperatures in the air inlet duct and the gas outlet duct; means for obtaining the total of said temperatures; means associated with said totalizing means and operative when said temperature total drops to a predetermined value for initiating the opening of said recirculation damper; and means responsive to the flow of a relatively high, predetermined volume of air through said air inlet duct for initiating the opening of said damper in said by-pass duct.

ROLAND S. COOPER.
PER HILMER KARLSSON.

REFERENCES CITED

The following references are of record in the file of this patent:

UNITED STATES PATENTS

| Number | Name | Date |
|---|---|---|
| 1,927,215 | Peebles | Sept. 19, 1933 |
| 2,320,911 | Cooper | June 1, 1943 |
| 2,321,129 | Cooper | June 8, 1943 |